(12) United States Patent
Kodama et al.

(10) Patent No.: US 8,608,384 B2
(45) Date of Patent: Dec. 17, 2013

(54) ROTATING DEVICE

(75) Inventors: Mitsuo Kodama, Fujieda (JP); Taketo Nonaka, Fujieda (JP)

(73) Assignee: Samsung Electro-Mechanics Japan Advanced Technology Co., Ltd., Fujieda (JP)

( * ) Notice: Subject to any disclaimer, the term of this patent is extended or adjusted under 35 U.S.C. 154(b) by 45 days.

(21) Appl. No.: 13/400,912

(22) Filed: Feb. 21, 2012

(65) Prior Publication Data

US 2013/0216166 A1    Aug. 22, 2013

(51) Int. Cl.
*F16C 32/06* (2006.01)
(52) U.S. Cl.
USPC .......................................... 384/107; 384/112
(58) Field of Classification Search
USPC .......... 384/114, 121, 100, 107, 112, 119, 132
See application file for complete search history.

(56) References Cited

U.S. PATENT DOCUMENTS

| | | | | |
|---|---|---|---|---|
| 5,533,811 A * | 7/1996 | Polch et al. | ..................... | 384/107 |
| 5,718,516 A * | 2/1998 | Cheever et al. | ............... | 384/114 |
| 6,971,798 B2 * | 12/2005 | Hayashi | ......................... | 384/112 |
| 7,021,829 B2 * | 4/2006 | Tamaoka | ....................... | 384/112 |
| 7,290,934 B2 * | 11/2007 | Nishimura et al. | ........... | 384/107 |
| 7,625,123 B2 * | 12/2009 | Ishikawa et al. | ............... | 384/100 |
| 7,931,404 B2 * | 4/2011 | Nishino et al. | ................. | 384/100 |
| 2006/0002641 A1 * | 1/2006 | Ichiyama | ....................... | 384/100 |
| 2006/0222276 A1 * | 10/2006 | Uenosono | ....................... | 384/107 |
| 2007/0140606 A1 * | 6/2007 | Feng et al. | ..................... | 384/107 |
| 2007/0201779 A1 * | 8/2007 | Kim | ............................... | 384/107 |
| 2009/0140587 A1 * | 6/2009 | Popov et al. | ..................... | 310/90 |
| 2009/0140588 A1 * | 6/2009 | Drautz et al. | ................... | 310/90 |
| 2010/0277833 A1 | 11/2010 | Sugiki | | |

FOREIGN PATENT DOCUMENTS

| | | |
|---|---|---|
| JP | 2009-162246 A | 7/2009 |
| JP | 2010-127448 A | 6/2010 |
| JP | 2011-002024 A | 1/2011 |
| JP | 2011-012737 A | 1/2011 |

* cited by examiner

*Primary Examiner* — Phillip A Johnson
(74) *Attorney, Agent, or Firm* — Holtz, Holtz, Goodman & Chick, PC

(57) ABSTRACT

The rotating device includes a fixing body having a shaft and a shaft holder fixing the shaft, a rotating body having a shaft encircling member with a cylinder part encircling a shaft and a disk part, and a middle encircling member encircling the cylinder part and facing the disk part via a clearance in the direction of a rotational axis, a radial dynamic pressure generating groove disposed in either one of a surface of the cylinder part and a surface of the shaft facing with each other in the radial direction, a thrust dynamic pressure generating groove disposed in either one of a surface of the disk part and a surface of the shaft holder facing with each other in the rotational axis direction, and a lubricant continuously present from a first air-liquid interface to a second air-liquid interface between the rotating body and the fixing body.

20 Claims, 3 Drawing Sheets

ROTATING DEVICE

BACKGROUND OF THE INVENTION

1. Field of the Invention

The present invention relates to a rotating device having a shaft fixed to a fixing body.

2. Description of the Related Art

Disk drive devices like a hard disk drive are becoming compact and increasing the capacity thereof, and are built in various electronic devices. Such disk drive devices are popularly built in, in particular, portable electronic devices, such as a laptop computer and a portable music player. The disk drive devices built in such portable electronic devices require improved shock resistance and vibration resistance so as to withstand a shock due to falling and a vibration when carried in comparison with disk drive devices built in stationary electronic devices like a desktop computer.

For example, JP 2009-162246 A and JP 2010-127448 A disclose a motor which has a shaft fixed to a base plate and which also has a bearing that is a fluid dynamic bearing mechanism.

According to the conventional fixed-shaft motor disclosed in JP 2009-162246 A and JP 2010-127448 A, a dynamic pressure generator is formed in the direction of a rotational axis R so as to be held between two tapered seals. According to this configuration, if there is a limitation for the thickness of the motor, it is necessary to reduce the dimension of the dynamic pressure generator in the direction of the rotational axis R. This reduces the rigidity of the bearing, which negatively affects the shock resistance and vibration resistance of the motor. Moreover, such a motor has a fixing body and a rotating body, and when receives a shock like falling, the surface of the fixing body and that of the rotating body in the direction of the rotational axis R may contact with each other. The contact of the rotating body with the fixing body may result in a cause of breakdown in the worst case.

Furthermore, according to such a motor, it is necessary to reduce the dimension of the tapered seal in the direction of the rotational axis R. In this case, if a clearance in the radial direction is increased to maintain the lubricant retaining amount by the tapered seal, capillary force becomes weak. When the capillary force by the tapered seal decreases, the lubricant often leaks.

Such a technical issue is not only for the motors but also for other kinds of rotating devices, in particular, rotating devices having a shaft fixed to a fixing body and also having a fluid dynamic bearing.

The present invention has been made in view of such a circumstance, and it is an object of the present invention to provide a rotating device that has an increased rigidity of a bearing or is capable of reducing the leak-out of a lubricant.

SUMMARY OF THE INVENTION

A first aspect of the present invention provides a rotating device that includes: a fixing body including a shaft with a first end and a second end, and a shaft holder fixing the first end of the shaft; a rotating body including a shaft encircling member and a middle encircling member, the shaft encircling member including a cylinder part encircling the shaft, and a disk part extending from an end of the cylinder part at a side of a shaft holder in a radial direction and having an outer periphery protruding outwardly of the cylinder part in the radial direction, and the middle encircling member including an inner periphery encircling the cylinder part, and an end face facing an end face of the disk part in a direction of a rotational axis via a clearance; a radial dynamic pressure generating groove disposed in either one of a surface of the cylinder part and a surface of the shaft facing with each other in the radial direction; a thrust dynamic pressure generating groove disposed in either one of a surface of the disk part and a surface of the shaft holder facing with each other in the rotational axis direction; a lubricant continuously present from a first air-liquid interface to a second air-liquid interface between the rotating body and the fixing body; and an encircling member fixed to the shaft holder while encircling the middle encircling member, and having an inner periphery where the first air-liquid interface of the lubricant contacts.

A second aspect of the present invention provides a rotating device that includes: a fixing body including a shaft with a first end and a second end, and a shaft holder fixing the first end of the shaft; a rotating body including a shaft encircling member and a middle encircling member, the shaft encircling member including a cylinder part encircling the shaft, and a disk part extending from an end of the cylinder part at a side of a shaft holder in a radial direction and having an outer periphery protruding outwardly of the cylinder part in the radial direction, and the middle encircling member including an inner periphery encircling the cylinder part, and an end face facing an end face of the disk part in a direction of a rotational axis via a clearance; a radial dynamic pressure generating groove disposed in either one of a surface of the cylinder part and a surface of the shaft facing with each other in the radial direction; a thrust dynamic pressure generating groove disposed in either one of a surface of the disk part and a surface of the shaft holder facing with each other in the rotational axis direction; and a lubricant continuously present from a first air-liquid interface to a second air-liquid interface between the rotating body and the fixing body.

Any combination of the above-explained structural elements and replacement of the structural element and technical term of the present invention between a method, an apparatus, and a system, etc, are also effective as an embodiment of the present invention.

According to the present invention, it becomes possible to increase the rigidity of a bearing or to reduce the leak-out of a lubricant.

DETAILED DESCRIPTION OF THE PREFERRED EMBODIMENTS

An explanation will be given of a preferred embodiment of the present invention with reference to the accompanying drawings. The same or similar structural element or member will be denoted by the same reference numeral throughout the figures, and the duplicated explanation will be omitted accordingly. The dimension of each member in the figure is enlarged or reduced as needed to facilitate understanding for the present invention. A part of the member not important to explain an embodiment of the present invention in the figure will be also omitted.

A rotating device according to an embodiment of the present invention is suitably used as a disk drive device like a hard disk drive on which a magnetic recording disk is to be mounted and which rotates and drives such a disk. In particular, the rotating device of the embodiment is a fixed-shaft disk drive device which has a shaft fixed to a base and which rotates a hub against the shaft.

<Embodiments>

Figure 1:
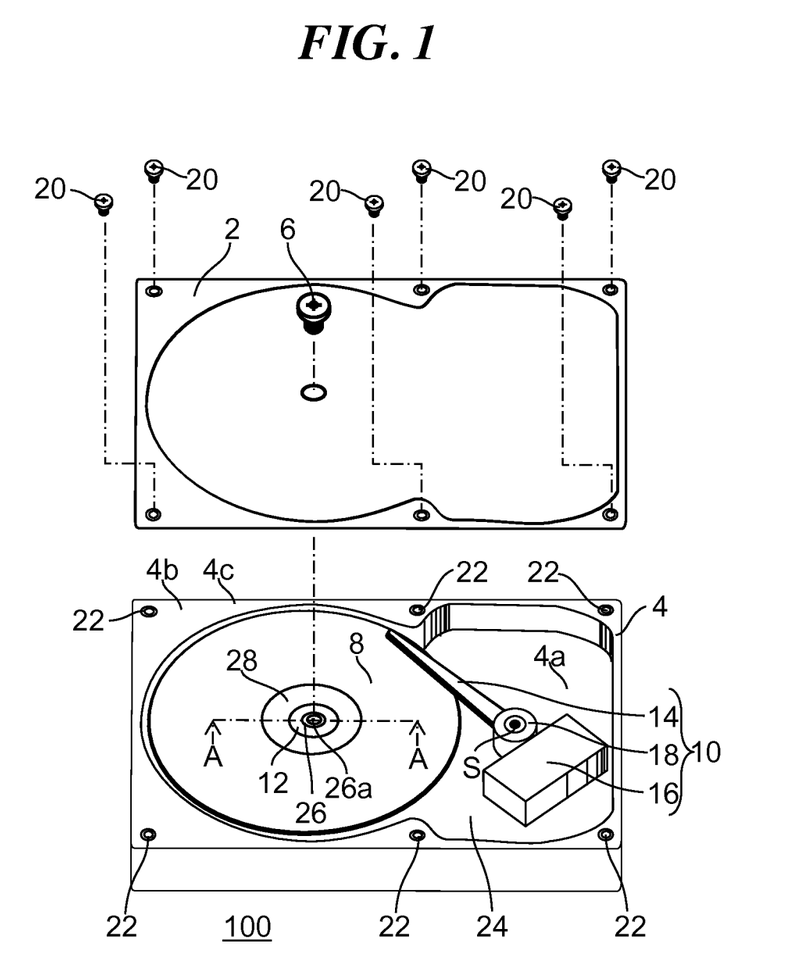
FIG. 1 is a perspective view showing a rotating device according to a first embodiment.

FIG. 1 is a perspective view showing a rotating device 100 according to an embodiment of the present invention. FIG. 1 shows a condition in which a top cover 2 is detached in order to facilitate understanding for the present invention. The rotating device 100 includes a fixing body, a rotating body that rotates relative to the fixing body, magnetic recording disks 8 attached to the rotating body, and a data reader/writer 10. The fixing body includes a base 4, a shaft 26 fixed to the base 4, the top cover 2, six screws 20, and a shaft fixing screw 6. The rotating body includes a hub 28.

In the following explanation, the side where the hub 28 is mounted on the base 4 is defined as a top.

The magnetic recording disk 8 is a 2.5-inch magnetic recording disk formed of a glass and having a diameter of 65 mm. The diameter of the center opening thereof is 20 mm and the thickness of such a disk is 0.65 mm. For example, two magnetic recording disks 8 are mounted on the hub 28.

The base 4 is formed by, for example, die-casting of an aluminum alloy. The base 4 includes a bottom plate 4a that forms a bottom of the rotating device 100, and an outer periphery wall 4b formed along the outer periphery of the bottom plate 4a so as to surround the area where the magnetic recording disks 8 are mounted. A top face 4c of the outer periphery wall 4b is provided with, for example, six screw holes 22.

The data reader/writer includes a recording/playing head (unillustrated), a swing arm 14, a voice coil motor 16, and a pivot assembly 18. The recording/playing head is attached to the tip of the swing arm 14, records data in the magnetic recording disks 8, or reads the data therefrom. The pivot assembly 18 supports the swing arm 14 in a swingable manner to the base 4 around a head rotating shaft S. The voice coil motor 16 allows the swing arm 14 to swing around the head rotating shaft S to move the recording/playing head to a desired location over the top face of the magnetic recording disk 8. The voice coil motor 16 and the pivot assembly 18 are configured by a conventionally well-known technology of controlling the position of a head.

The top cover 2 is fixed to the top face 4c of the outer periphery wall 4b of the base 4 using, for example, six screws 20. The six screws 20 correspond to the six screw holes 22, respectively. In particular, the top cover 2 and the top face 4c of the outer periphery wall 4b are fixed to each other so that no leak into the interior of the rotating device 100 occurs at the joined portion therebetween. The interior of the rotating device 100 means, more specifically, a clean space 24 defined by the bottom plate 4a of the base 4, the outer periphery wall 4b thereof, and the top cover 2. The clean space 24 is designed so as to be hermetically closed, i.e., no leak-in from the exterior or no leak-out to the exterior occurs. The clean space 24 is filled with clean air having particles eliminated. Hence, adhesion of foreign materials like particles to the magnetic recording disks 8 is suppressed, thereby increasing the reliability of the operation of the rotating device 100.

The shaft 26 has a shaft fixing screw hole 26a provided in a top end face thereof. The shaft 26 has a bottom end fixed to the base 4 by a technique to be discussed later. The shaft fixing screw 6 passes all the way through the top cover 2 and is screwed in the shaft fixing screw hole 26a, and thus the top end of the shaft 26 is fixed to the top cover 2. The top cover 2 is fixed to the base 4.

Among the fixed-shaft type rotating devices, the rotating device that fixes both ends of the shaft 26 to chassis, such as the base 4 and the top cover 2, can improve the resistances against shock and vibration. According to the rotating device of this type, when a fluid dynamic bearing is used, in general, a lubricant has two air-liquid interfaces.

According to the rotating device 100 of the present embodiment, instead of simply arranging the two air-liquid interfaces and a dynamic pressure generating groove in a line in the direction of a rotational axis R (a direction along the rotational axis R), the passage of a lubricant is turned back so as to expand in the radial direction. Accordingly, the passages of the lubricant partially overlap in the direction of the rotational axis R. Hence, when there is a restriction for the thickness of the rotating device 100, it is possible to increase the ratio of a portion corresponding to the dynamic pressure generating groove relative to the whole thickness. As a result, the bearing span that is the dimension of the dynamic pressure generating groove in the axial direction is extended, thereby increasing the rigidity of a bearing. Moreover, the distance between the two air-liquid interfaces can be reduced. As a result, the leak-out of the lubricant due to the gravity acting on the lubricant and the pressure difference between the two air-liquid interfaces can be suppressed.

Figure 2:
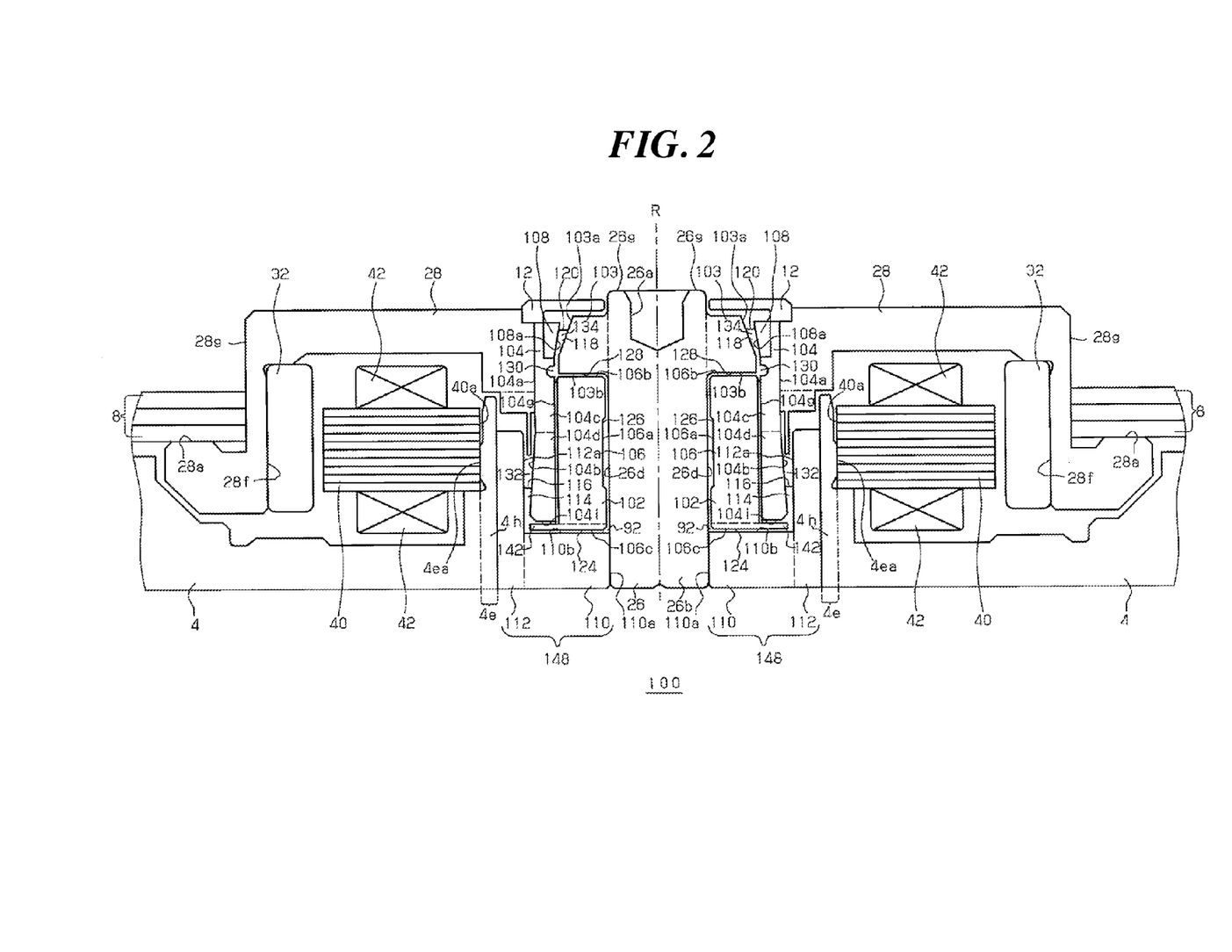
FIG. 2 is a cross-sectional view taken along a line A-A in FIG. 1.

FIG. 2 is a cross-sectional view taken along a line A-A in FIG. 1.

The rotating body includes the hub 28, a cylindrical magnet 32, a shaft encircling member 102, a middle encircling member 104, an annular member 108, and a cap 12. The fixing body includes the base 4, a stacked core 40, a coil 42, the shaft 26, a housing 148, and a flange member 103. A lubricant is continuously present in some of the spaces between the rotating body and the fixing body.

When assembling the rotating device 100, first, a fluid dynamic bearing unit including the housing 148, the middle encircling member 104, the shaft encircling member 102, the annular member 108, the lubricant 92, and the shaft 26 is manufactured. Next, the hub 28 is fixed to the fluid dynamic bearing unit. Finally, the base 4 is fixed to the fluid dynamic bearing unit, and the rotating device 100 is manufactured through the other processes. The base 4 supports the hub 28 in a freely rotatable manner through the fluid dynamic bearing unit.

The magnetic recording disk 8 is mounted on a disk mounting face 28a of the hub 28. The hub 28 is formed of an iron-and-steel material with a soft magnetic property like SUS430F. The hub 28 is formed by, for example, pressing and cutting an iron-and-steel plate, and is formed in a predetermined shape like a cup having a center opening along the rotational axis R. An example iron-and-steel material preferable for the hub 28 is stainless steel like one produced as DHS1 by DAIDO Steel Co., Ltd., which has little out-gas, and is easy to process. Moreover, stainless steel with a production name DHS2 by the same company is further preferable because of a better corrosion resistance.

The cylindrical magnet 32 is bonded and fixed to a cylindrical inner periphery 28f corresponding to the internal cylindrical surface of the hub 28 in a cup-like shape. The cylindrical magnet 32 is formed of a material, such as neodymium, iron, or born, and faces, for example, twelve protrusions (magnetic poles) of the stacked core 40 in the radial direction. Polarization with, for example, 16 poles for driving is performed on the cylindrical magnet 32 in the circumferential direction. A corrosion prevention treatment is performed on the surface of the cylindrical magnet 32 by electrodeposition coating, spray coating, etc.

The stacked core 40 includes an annular part and the twelve protrusions extending therefrom outwardly in the radial direction, and is fixed to the top face of the base 4. The stacked core 40 is formed by stacking, for example, thin electromagnetic steel plates and integrating those together by caulking. An insulative coating is applied on the surface of the stacked core 40 by electrodeposition coating, powder coating, etc. A coil 42 is wound around each protrusion of the stacked core 40. When a driving current of a substantially sine wave with three phases flows through the coil 42, driving magnetic fluxes are generated along the protrusions.

The base 4 includes a cylindrical protrusion 4e along the rotational axis R of the rotating body. The protrusion 4e protrudes from the top face of the base 4 toward the hub 28 so as to encircle the housing 148. An outer periphery 4ea of the protrusion 4e is fitted in a center opening 40a of the annular part of the stacked core 40, and thus the stacked core 40 is fixed to the base 4. The annular part of the stacked core 40 is bonded and fixed to the protrusion 4e by, in particular, press-in or loose fit.

The housing 148 includes a flat and annular shaft holder 110 and a cylindrical encircling member 112 fixed to the outer periphery of the shaft holder 110. The shaft holder 110 and the encircling member 112 are joined together in such a way that the whole outer periphery of the shaft holder 110 contacts a lower part of an inner periphery 112a of the encircling member 112. In particular, the shaft holder 110 and the encircling member 112 can be formed integrally in a seamless manner. In this case, the manufacturing error of the housing 148 can be reduced, and a joining work can be eliminated. The encircling member 112 is encircled by the protrusion 4e. In particular, the encircling member 112 is fixed to a bearing hole 4h along the rotational axis R provided in the inner periphery of the protrusion 4e, i.e., the base 4 by bonding.

The bottom end of the shaft 26 is fixed to a shaft hole 110a along the rotational axis R provided in the shaft holder 110, i.e., the inner periphery of the shaft holder 110 by, in particular, interference fitting. Such interference fitting is accomplished by, for example, pressing the shaft 26 in the shaft hole 110a, thermal inserting, or inserting the shaft 26 cooled by a liquid nitrogen in the shaft opening 110a, and then letting the shaft 26 to be a normal temperature. It is fine if bonding is further applied together with the interference fitting. The shaft 26 includes a columnar rod 26b along the rotational axis R. The flange 103 encircles the top end of the rod 26b and is fixed thereto. In particular, the rod 26b and the flange 103 are integrally formed. That is, the flange 103 and the shaft 26 are formed in a seamless manner. In this case, the manufacturing error of the shaft 26 and that of the flange 103 can be reduced, and a joining work can be eliminated. More specifically, in comparison with a case in which the shaft 26 and the flange 103 are formed as separate pieces, the assembling becomes precise.

This facilitates the designing of the shape of a tapered seal (a second tapered seal 118 to be discussed later), and thus the amount of the lubricant 92 can be easily determined in the designing stage. The lubricant 92 is an expensive material in the rotating device 100, and it is necessary to set the amount of the lubricant 92 to be filled in the rotating device 100 in consideration of the amount of the lubricant 92 to be vaporized and spilled out in advance. According to such a configuration, the filled amount of the lubricant 92 can be determined precisely, thereby reducing the amount of unnecessary lubricant 92.

The shaft encircling member 102 includes a cylinder part 106 that encircles the shaft 26, and a disk part 142 which extends from the end of the cylinder part 106 at the shaft holder 110 side in the radial direction, and which has an outer periphery protruding outwardly of the cylinder part 106 in the radial direction. The cylinder part 106 encircles a middle portion of the shaft 26 between a portion thereof fitted in the shaft hole 110a and another portion of the shaft 26 encircled by the flange 103. The disk part 142 is a flat disk protruding in the radial direction from the lower end of the cylinder part 106, has an inner periphery encircling the shaft 26 and has the outer periphery protruding outwardly of the cylinder part 106 in the radial direction and facing the encircling member 112 in the radial direction. The cylinder part 106 and the disk part 142 are formed integrally in a seamless manner. The lubricant 92 is present between the cylinder part 106 and the middle portion of the shaft 26. That is, an inner periphery 106a of the cylinder part 106 faces an outer periphery 26d of the middle portion of the shaft 26 via a first clearance 126 which is filled by the lubricant 92.

The cylinder part 106 faces the flange 103 in the direction of the rotational axis along the rotational axis R. The disk part 142 faces the shaft holder 110 in the direction of the rotational axis. The lubricant 92 is present between the cylinder part 106 and the flange 103 and between the disk part 142 and the shaft holder 110. That is, a top face 106b of the cylinder part 106 faces a lower face 103b of the flange 103 via a second clearance 128 which is filled with the lubricant 92. A lower face 142c of the disk part 142 faces a top face 110b of the shaft holder 110 via a third clearance 124 which is filled with the lubricant 92.

When the rotating device receives a shock like falling, the rotating body may move downwardly and contact the fixing body. For example, the lower face 142c of the disk part 142 included in the rotating body may contact the top face 110b of the shaft holder 110 included in the fixing body. The disk part 142 has a larger diameter than that of the cylinder part 106, making the area to be contact the shaft holder 110 large. When the contact area becomes large, the braking force produced by the lubricant 92 present between those faces increases, thereby reducing a damage in the case of contact.

The middle encircling member 104 includes an inner periphery 104g encircling the cylinder part 106, and an end face 104i facing a top face 142a of the disk part 142 via a clearance 144 in the direction of the rotational axis. The middle encircling member 104 is fixed to the outer periphery of the cylinder part 106 by bonding or press-fitting. The hub 28 is fixed to an outer periphery 104a of an upper part 104c of the middle encircling member 104 by bonding or press-fitting. Regarding the positional relationship between the encircling member 112 and the middle encircling member 104, the encircling member 112 encircles a lower part 104d of the middle encircling member 104.

Formed between the encircling member 112 and the middle encircling member 104 is a first tapered seal 114 where a fourth clearance 132 between an inner periphery 112a of the encircling member 112 and an outer periphery 104b of the lower part 104d of the middle encircling member 104 gradually becomes widespread toward the top. In particular, the inner periphery 112a of the encircling member 112 is formed so as to be substantially parallel to the rotational axis R, and the outer periphery 104b of the lower part 104d of the middle encircling member 104 is formed so as to have a smaller diameter as coming closer to a shaft top end face 26g that is the top face of the shaft 26. This defines the tapered shape of the first tapered seal 114. The first tapered seal 114 has a first air-liquid interface 116 of the lubricant 92, and suppresses a leak-out of the lubricant 92 by a capillary phenomenon. That is, the lubricant 92 is preset at least partially between the encircling member 112 and the middle encircling member 104. The first air-liquid interface 116 of the lubricant 92 contacts both inner periphery 112a of the encircling member 112 and outer periphery 104b of the lower part 104d of the middle encircling member 104.

The annular member 108 is provided at the side of the top end of the middle encircling member 104 and is provided at a location facing the flange 103 in the radial direction. The annular member 108 is in a substantially ring shape, encircles the flange 103, and is bonded and fixed to the upper part 104c of the middle encircling member 104. The annular member 108 is formed separately from the middle encircling member 104.

Formed between the annular member 108 and the flange 103 is the second tapered seal 118 where a fifth clearance 134 between an inner periphery 108a of the annular member 108 and an outer periphery 103a of the flange 103 becomes gradually widespread toward the top. In particular, both inner periphery 108a of the annular member 108 and outer periphery 103a of the flange 103 have a smaller diameter as coming close to the shaft top end face 26g. That is, both inner periphery 108a of the annular member 108 and the outer periphery 103a of the flange 103 have a smaller radius as becoming apart from the shaft holder 110. The ratio of reducing the diameter of the inner periphery 108a of the annular member 108 is smaller than the ratio of reducing the diameter of the outer periphery 103a of the flange 103. This defines the tapered shape of the tapered seal 118. When the rotating body rotates, force outwardly of the radial direction originating from centrifugal force acts on the lubricant 92 in the second tapered seal 118. Since the inner periphery 108a of the annular member 108 has a radius becoming smaller as becoming apart from the shaft holder 110, such force acts so as to suction the lubricant 92.

The second tapered seal 118 has a second air-liquid interface 120 of the lubricant 92, and suppresses a leak-out of the lubricant 92 by a capillary phenomenon. That is, the lubricant 92 is present at least partially between the annular member 108 and the flange 103. The second air-liquid interface 120 of the lubricant 92 contacts both inner periphery 108a of the annular member 108 and outer periphery 103a of the flange 103.

The cap 12 is an annular member having a cross section in a reversed L shape and fixed to the top face of the rotating body so as to cover the second air-liquid interface 120, the annular member 108, and the flange 103.

Figure 3:
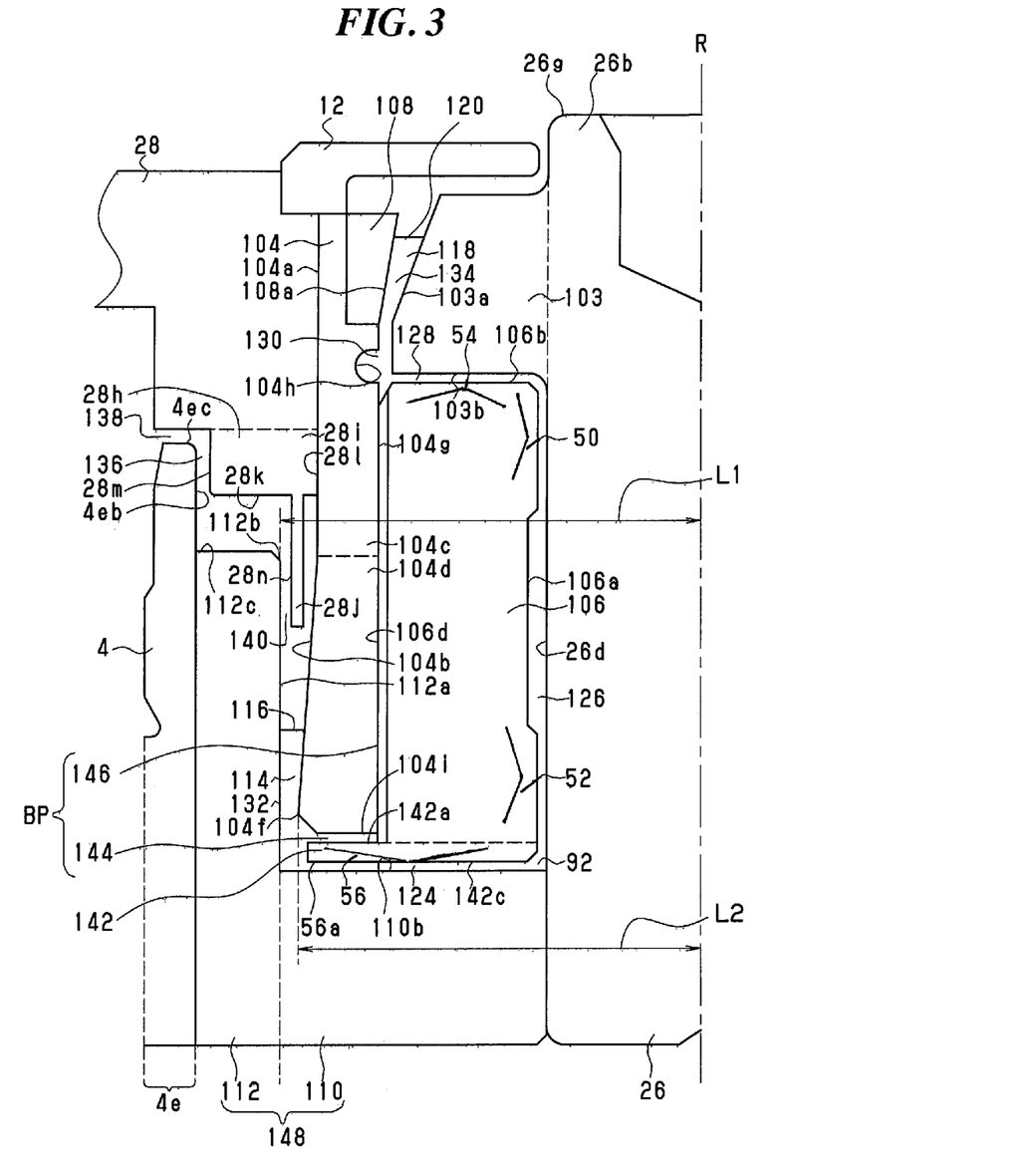
FIG. 3 is an enlarged cross-sectional view around the passage of a lubricant in FIG. 2 in an enlarged manner.

FIG. 3 is an enlarged cross-sectional view showing the vicinity of the left half of the fluid dynamic bearing unit in FIG. 2 in an enlarged manner. The inner periphery 106a of the cylinder part 106 is formed with a pair of herringbone radial dynamic pressure generating grooves distant from each other in the radial direction which are a first radial dynamic pressure generating groove 50 and a second radial dynamic pressure generating groove 52. The first radial dynamic pressure generating groove 50 is formed above the second radial dynamic pressure generating groove 52. At least one of the first and second radial dynamic pressure generating grooves 50 and 52 may be formed in the outer periphery 26d of the middle portion of the shaft 26 instead of the inner periphery 106a of the cylinder part 106.

The top face 106b of the cylinder part 106 is formed with a first thrust dynamic pressure generating groove 54 in a herringbone shape or a spiral shape. The first thrust dynamic pressure generating groove 54 is disposed at a ring-shape area coaxial with the rotating axis R. The first thrust dynamic pressure generating groove 54 may be formed in the lower face 103b of the flange 103 instead of the top face 106b of the cylinder part 106.

The lower face 142c of the disk part 142 is formed with a second thrust dynamic pressure generating groove 56 in a herringbone shape or a spiral shape. The second thrust dynamic pressure generating groove 56 is disposed at a ring-shape area coaxial with the rotating axis R. An outer border 56a of the area where the second thrust dynamic pressure generating groove 56 is disposed is located outwardly of an outer periphery 106d of the cylinder part 106 in the radial direction. Alternatively, the outer border 56a of the area where the second thrust dynamic pressure generating groove 56 is disposed is located outwardly of an outer border of the second air-liquid interface 120 of the lubricant 92 in the radial direction. That is, by providing the disk part 142, the second thrust dynamic pressure generating groove 56 can be located at further external side. This increases the thrust dynamic pressure, which attributes to the improvement of the rigidity of the bearing. The second thrust dynamic pressure generating groove 56 may be formed in the top face 110b of the shaft holder 110 instead of the lower face 142c of the disk part 142.

When the rotating body rotates relative to the fixing body, the first and second radial dynamic pressure generating grooves 50 and 52 and the first and second thrust dynamic pressure generating grooves 54 and 56 generate dynamic pressures to the lubricant 92, respectively. Such dynamic pressures support the rotating body in the radial direction and in the rotational axis direction in a non-contact manner with the fixing body.

The middle encircling member 104 and the annular member 108 are formed so as to have a smaller diameter than a circumferential edge 112b of the inner periphery of the encircling member 112 at the shaft top end face 26g side. A lower part of the outer periphery 104b of the lower part 104d of the middle encircling member 104 forms a circumferential edge 104f that is the outermost periphery. Providing that the radius of the circumferential edge 104f is L2, the outer periphery 104a of the upper part 104c of the middle encircling member 104 is formed so as to have a smaller radius than the radius L2 of the circumferential edge 104f. Hence, the middle encircling member 104 is formed in such a way that the circumferential edge 104f has a smaller radius L2 than a radius L1 of a circumferential edge 112b. The outer periphery of the disk part 142 is formed so as to have the same or slightly smaller radius than that of the circumferential edge 104f. That is, the minimum radius of the inner periphery 112a of the encircling member 112 is larger than the maximum radius of the outer periphery 104 of the middle encircling member 104. The advantage of such a configuration will be discussed later.

The passage of the lubricant 92 from the first air-liquid interface to the second air-liquid interface 120 includes a part of the fourth clearance 132, the third clearance 124 where the disk part 142 and the shaft holder 110 face with each other in the rotational axis direction, the first clearance 126, the second clearance 128, and a part of the fifth clearance 134 in this order. A lubricant reservoir 130 is provided on the passage of the lubricant 92 between the second air-liquid interface 120 and the second clearance 128 for retaining the lubricant 92. In particular, the lubricant reservoir 130 is a space surrounded by the cylinder part 106, the middle encircling member 104, and the flange 103. The inner periphery 104g of the middle encircling member 104 is provided with an annular recess 104h. The recess 104h forms a part of the lubricant reservoir 130. In this case, the lubricant reservoir 130 can be formed through relatively well-known and easy processing, such as chamfering on the top face 106b of the cylinder part 106, and grooving on the inner periphery 104g of the middle encircling member 104. By providing the lubricant reservoir 130, it becomes possible to retain a larger amount of the lubricant 92, thereby suppressing a reduction of the operating life inherent to vaporization and depletion of the lubricant 92.

The protrusion 4e of the base 4 encircles a part of the hub 28. That is, the hub 28 includes a hub entering part 28h which protrudes toward the base 4 and which enters between the protrusion 4e and the middle encircling member 104. A part of the hub entering part 28h is encircled by the encircling member 112. Since the hub entering part 28h is present, the end face of the protrusion 4e at the shaft top end face 26g side, i.e., a top face 4ea can be located at a closer position to the shaft top end face 26g in the rotational axis direction beyond the end face at the shaft top end face 26g, i.e., a top face 112c.

The hub entering part 28h includes an annular entering base 28i, and an annular tapered-space entering part 28j protruding from a lower face 28k of the entering base 28i toward the first air-liquid interface 116. An inner periphery 28l of the entering base 28i contacts the outer periphery 104a of the upper part 104c of the middle encircling member 104. An outer periphery 28m of the entering base 28i faces an inner periphery 4eb of the protrusion 4e in the radial direction via a seventh clearance 136. The top face 4ec of the base 4 faces the hub 28 in the rotational axis direction via an eighth clearance 138.

The tapered-space entering part 28j enters the fourth clearance 132 so as not to contact the first air-liquid interface 116. An outer periphery 28n of the tapered-space entering part 28j and the inner periphery 112a of the encircling member 112 face with each other in the radial direction via a ninth clearance 140.

The seventh, eighth, and ninth clearances 136, 138, and 140 serve as a labyrinth against the lubricant 92 vaporized from the first air-liquid interface 116, and prevents the vaporized lubricant 92 from reaching the magnetic recording disks 8.

The rotating body has a communicating passage BP that communicates the first tapered seal 114 with the second tapered seal 118 separately from the first clearance 126. The communicating passage BP suppresses a generation of a pressure difference between the first tapered seal 114 and the second tapered seal 118. The communicating passage BP may include a passage in the rotational axis direction provided in at least either one of the middle encircling member 104 and the cylinder part 106. Alternatively, the communicating passage BP may include a passage in the radial direction provided in at least either one of the disk part 142 and the middle encircling member 104. According to this embodiment, the communicating passage BP includes a recess 146 provided in the outer periphery 106d of the cylinder part 106 along the rotational axis R, and the clearance 144 where the disk part 142 faces the middle encircling member 104 in the direction of the rotational axis. The clearance 144 may be, for example, continuous in the circumferential direction, or may be a partial clearance in the circumferential direction as long as it is communicated with a passage between the middle encircling member 104 and the cylinder part 106 by providing a recess in the radial direction in either one of the disk part 142 and the middle encircling member 104. The communication passage BP has an aperture opened in the first tapered seal 114 outwardly of the radial direction. Such an aperture is provided in a location overlapping a region where the second radial dynamic pressure generating groove 52 is formed in the rotational axis direction. More specifically, the aperture is provided in a closer location to the end of such a region closer to the base 4 rather than the end of such a region closer to the hub 28. By providing the aperture at the lower location, the first air-liquid interface 116 can be provided at an area distant from the top end of the third clearance 132, resulting in the reduction of the possibility of a leak-out of the lubricant 92.

Next, an explanation will be given of an operation of the rotating device 100 employing the above-explained configuration. A drive current with three phases is supplied to the coil 42 in order to rotate the magnetic recording disk 8. The drive current flowing through the coil 42 generates magnetic fluxes along the twelve protrusions. The magnetic fluxes provide torque to the cylindrical magnet 32, and thus the rotating body and the magnetic recording disk 8 mounted thereon start rotating. Simultaneously, the voice coil motor 16 causes the swing arm 14 to swing, and thus the recording/playing head moves in and out within the swing range over the magnetic recording disk 8. The recording/playing head converts magnetic data recorded in the magnetic recording disk 8 into electronic signals, transmits such signals to an unillustrated control substrate, and writes data transmitted from the control substrate as electronic signals in the magnetic recording disk 8.

According to the rotating device 100 of this embodiment, the annular member 108 formed separately from the middle encircling member 104 is attached to the middle encircling member 104. The inner periphery 108a of the annular member 108 has a radius (the inner diameter of the annular member 108) becoming smaller as coming closer to the shaft top end face 26g, which enables attachment of the annular member 108 to the middle encircling member 104 at the later stage in the manufacturing process of the fluid dynamic bearing unit.

As an example, the middle encircling member 104 is fixed to the shaft encircling member 102, the shaft 26 is fitted in the shaft encircling member 102, the bottom end of the shaft 26 is fixed in the shaft hole 110a of the shaft holder 110, and then the annular member 108 can be attached to the middle encircling member 104 like a "lid". Accordingly, during the processing for members other than the annular member 108, the possibility that the inner periphery 108a of the annular member 108 and the outer periphery 103a of the flange 103 are in friction with each other and thus abrasion occurs is reduced. Moreover, a possibility that relatively large force is applied to those surfaces and thus deformation occurs is also reduced. This results in the improvement of the precision of the shape and dimension of the second tapered seal 118. This attributes to the reduction of the manufacturing error of the second tapered seal 118. Furthermore, the work can be progressed without any worry about the occurrence of such abrasion and deformation, and thus the work efficiency improves.

In general, when the fluid dynamic bearing unit is manufactured, before the base 4 and the hub 28 are attached to the fluid dynamic bearing unit, respective positions of the first air-liquid interface 116 and the second air-liquid interface 120 in the rotational axis direction are inspected. According to the rotating device 100 of this embodiment, the middle encircling member 104 and the annular member 108 have a smaller radius than that of the circumferential edge 112b of the encircling member 112. Hence, an access to the first air-liquid interface 116 from the side of the shaft top end face 26g becomes easy, and the inspection of the position of the first air-liquid interface 116 in the rotational axis direction becomes easy and precise. For example, it is possible to easily and visually check the first air-liquid interface 116 from the side of the shaft top end face 26g. Moreover, when the position of the first air-liquid interface 116 in the rotational axis direction is inspected by emitting laser to the first air-liquid interface 116, the incident laser to the first air-liquid interface 116 from the side of shaft top end face 26g is not likely to be blocked. This facilitates the inspection of the position of the first air-liquid interface 116.

The explanation was given of the configuration and operation of the rotating device according to the embodiment of the present invention. Such an embodiment is an example, and those skilled in the art can understand that a combination of the above-explained structural elements can be changed and modified in various forms and such a modified example is also within the scope and spirit of the present invention.

In the above-explained embodiment, although the explanation was given of the case in which the housing is directly attached to the base, the present invention is not limited to this configuration. For example, a brushless motor including a rotating body and a fixing body may be individually formed, and such a brushless motor may be attached to a chassis.

What is claimed is:

1. A rotating device comprising:
    a fixing body including a shaft with a first end and a second end, and a shaft holder fixing the first end of the shaft;
    a rotating body including a shaft encircling member and a middle encircling member, the shaft encircling member including a cylinder part encircling the shaft, and a disk part extending from an end of the cylinder part at a side of the shaft holder in a radial direction vertical to a rotational axis of the rotating body and having an outer periphery protruding outwardly of the cylinder part in the radial direction, and the middle encircling member including an inner periphery encircling the cylinder part, and an end face facing an end face of the disk part in a direction of the rotational axis via a clearance;
    a radial dynamic pressure generating groove disposed in either one of a surface of the cylinder part and a surface of the shaft facing with each other in the radial direction;
    a thrust dynamic pressure generating groove disposed in either one of a surface of the disk part and a surface of the shaft holder facing with each other in the rotational axis direction;
    a lubricant continuously present from a first air-liquid interface to a second air-liquid interface at least between the rotating body and the fixing body;
    an encircling member fixed to the shaft holder while encircling the middle encircling member, and having an inner periphery where the first air-liquid interface of the lubricant contacts;
    a passage filled with the lubricant, passing through the thrust dynamic pressure generating groove and the radial dynamic pressure generating groove, and reaching the second air-liquid interface from the first air-liquid interface; and
    a communicating passage including a rotational-axis-direction passage provided in at least one of the middle encircling member and the shaft encircling member, and a radial-direction passage provided in the clearance where the disk part and the middle encircling member face with each other in the rotational axis direction, being filled with the lubricant, and reaching the second air-liquid interface from the first air-liquid interface without passing through the thrust dynamic pressure generating groove and the radial dynamic pressure generating groove,
    wherein an outward opening of the radial-direction passage is provided at a location overlapping the radial dynamic pressure generating groove in the rotational axis direction.

2. The rotating device according to claim 1, wherein an outer border of an area where the thrust dynamic pressure generating groove is disposed is located outwardly of an outer periphery of the cylinder part in the radial direction.

3. The rotating device according to claim 1, wherein the shaft holder and the encircling member are formed seamlessly.

4. The rotating device according to claim 1, wherein a minimum radius of the inner periphery of the encircling member is larger than a maximum radius of an outer periphery of the middle encircling member, and a radius of the outer periphery of the disk part is equal to or smaller than the maximum radius of the outer periphery of the middle encircling member.

5. The rotating device according to claim 1, wherein the fixing body further includes a flange which encircles the second end of the shaft and which is fixed to the shaft, the rotating body further includes an annular member which encircles the flange and which is fixed to the rotating body, and the second air-liquid interface of the lubricant contacts an inner periphery of the annular member.

6. The rotating device according to claim 5, further comprising another thrust dynamic pressure generating groove disposed in either one of a surface of the cylinder part and a surface of the flange facing with each other in the rotational axis direction.

7. The rotating device according to claim 5, wherein the annular member is formed as a separate piece from the middle encircling member, and has an internal diameter which becomes smaller with distance from the shaft holder.

8. The rotating device according to claim 5, wherein the flange and the shaft are formed seamlessly.

9. The rotating device according to claim 5, wherein an outer border of an area where the thrust dynamic pressure generating groove is disposed is located outwardly of an outer edge of the second air-liquid interface of the lubricant in the radial direction.

10. The rotating device according to claim 1, wherein the rotating body further includes a hub which is fixed to the middle encircling member and on which a recording disk is to be mounted, the fixing body further includes a base that fixes the shaft holder, and the base includes a base protrusion which encircles the encircling member, protrudes toward the hub, and encircles a part of the hub.

11. The rotating device according to claim 10, wherein an end of the base protrusion at a side of the second end of the shaft is closer to the second end of the shaft beyond an end of the encircling member at the side of the second end of the shaft in the rotational axis direction.

12. The rotating device according to claim 10, wherein the hub further includes a hub entering part which protrudes toward the base, is encircled by the encircling member, and faces the first air-liquid interface with a clearance.

13. A rotating device comprising:
    a fixing body including a shaft with a first end and a second end, and a shaft holder fixing the first end of the shaft;
    a rotating body including a shaft encircling member and a middle encircling member, the shaft encircling member including a cylinder part encircling the shaft, and a disk part extending from an end of the cylinder part at a side of the shaft holder in a radial direction vertical to a rotational axis of the rotating body and having an outer periphery protruding outwardly of the cylinder part in the radial direction, and the middle encircling member including an inner periphery encircling the cylinder part, and an end face facing an end face of the disk part in a direction of the rotational axis via a clearance;

a radial dynamic pressure generation groove disposed in either one of a surface of the cylinder part and a surface of the shaft facing with each other in the radial direction;

a thrust dynamic pressure generation groove disposed in either one of a surface of the disk part and a surface of the shaft holder facing with each other in the rotational axis direction;

a lubricant continuously present from a first air-liquid interface to a second air-liquid interface at least between the rotating body and the fixing body;

a passage filled with the lubricant, passing through the thrust dynamic pressure generation groove and the radial dynamic pressure generation groove, and reaching the second air-liquid interface from the first air-liquid interface; and a communicating passage including a rotational-axis-direction passage provided in at least one of the middle encircling member and the shaft encircling member, and a radial-direction passage provided in the clearance where the disk part and the middle encircling member face with each other in the rotational axis direction, being filled with the lubricant, and reaching the second air-liquid interface from the first air-liquid interface without passing through the thrust dynamic pressure generating groove and the radial dynamic pressure generating groove, wherein an outer border of an area where the thrust dynamic pressure generating groove is disposed is located outwardly in the radial direction with respect to an outer edge of the second air-liquid interface of the lubricant.

14. The rotating device according to claim 13, wherein the outer border of the area where the thrust dynamic pressure generating groove is disposed is located outwardly of an outer periphery of the cylinder part in the radial direction.

15. The rotating device according to claim 13, wherein the fixing body further includes an encircling member which is fixed to the shaft holder and which encircles the middle encircling member, and the lubricant is present in a clearance in the radial direction between the encircling member and the middle encircling member.

16. The rotating device according to claim 13, wherein the fixing body further includes a flange which encircles the second end of the shaft and which is fixed to the shaft, the rotating body further includes an annular member which encircles the flange and which is fixed to the rotating body, and the second air-liquid interface of the lubricant contacts an inner periphery of the annular member.

17. The rotating device according to claim 16, wherein the annular member is formed as a separate piece from the middle encircling member, and has an internal diameter which becomes smaller with distance from the shaft holder.

18. The rotating device according to claim 13, wherein the fixing body further includes a flange which encircles the second end of the shaft and which is fixed to the shaft, and the rotating device further comprises another thrust dynamic pressure generating groove disposed in either one of a surface of the cylinder part and a surface of the flange facing with each other in the rotational axis direction.

19. The rotating device according to claim 13, wherein an annular recess concaved outwardly in the radial direction is provided in the middle encircling member near an opening of the communication passage at the second-air-liquid-interface side.

20. A rotating device comprising:

a fixing body including a shaft with a first end and a second end, and a shaft holder fixing the first end of the shaft;

a rotating body which encircles the shaft and which faces with the shaft holder;

a radial dynamic pressure generating groove that is disposed in either one of a surface of the rotating body and a surface of the shaft facing with each other in a radial direction vertical to a rotational axis of the rotating body;

a thrust dynamic pressure generating groove that is disposed in either one of a surface of the rotating body and a surface of the shaft holder facing with each other in a direction of the rotational axis of the rotating body;

a lubricant continuously present from a first air-liquid interface to a second air-liquid interface at least between the rotating body and the fixing body;

an encircling member which encircles a part of the rotating body, is fixed to the shaft holder and includes an inner periphery contacting the first air-liquid interface of the lubricant;

a passage filled with the lubricant, passing through the thrust dynamic pressure generating groove and the radial dynamic pressure generating groove, and reaching the second air-liquid interface from the first air-liquid interface; and a communicating passage provided in the rotating body, including a rotational-axis-direction passage running in parallel with the rotational axis, and a radial-direction passage running in the radial direction, being filled with the lubricant, and reaching the second air-liquid interface from the first air-liquid interface without passing through the thrust dynamic pressure generating groove and the radial dynamic pressure generating groove, wherein an outward opening of the radial-direction passage is provided at a location overlapping the radial dynamic pressure generating groove in the rotational axis direction.

* * * * *